April 4, 1939.  A. C. BOOKOUT ET AL  2,153,072

MEANS FOR SUSPENDING AERIAL CABLES

Filed April 13, 1937   2 Sheets-Sheet 1

INVENTORS
A. C. Bookout and
BY F. B. Pitts
ATTORNEY

April 4, 1939.  A. C. BOOKOUT ET AL  2,153,072

MEANS FOR SUSPENDING AERIAL CABLES

Filed April 13, 1937  2 Sheets-Sheet 2

INVENTORS
A.C. Bookout and
BY F.B. Pitts
William P. Ballard
ATTORNEY

Patented Apr. 4, 1939

2,153,072

UNITED STATES PATENT OFFICE 2,153,072

MEANS FOR SUSPENDING AERIAL CABLES

Archie Coleman Bookout and Frederick Baxter Pitts, Oklahoma City, Okla., assignors to American Telephone and Telegraph Company, a corporation of New York Application April 13, 1937, Serial No. 136,694

12 Claims. (Cl. 175—376)

This invention relates to aerial cable line construction and maintenance and, more particularly, to means whereby cables may be installed and supported by suspension or messenger strands.

It has been found in the present practice of supporting aerial cables from suspension or messenger strands by rings and the like, that the cables have been subjected to considerable damage from creeping and buckling which has caused ring cuts, sheath crystallization and other damage. This damage is expensive to repair and also interrupts service and the loss of revenue therefrom.

Accordingly, it is an object of this invention to provide a device for securing aerial cables on suspension strands whereby the cables are controlled as to movement so as to be efficiently held on the grades, and their expansion and contraction reduced. This and further objects of the invention will be apparent from the following description when considered in connection with the accompanying drawings.

Figure 1:
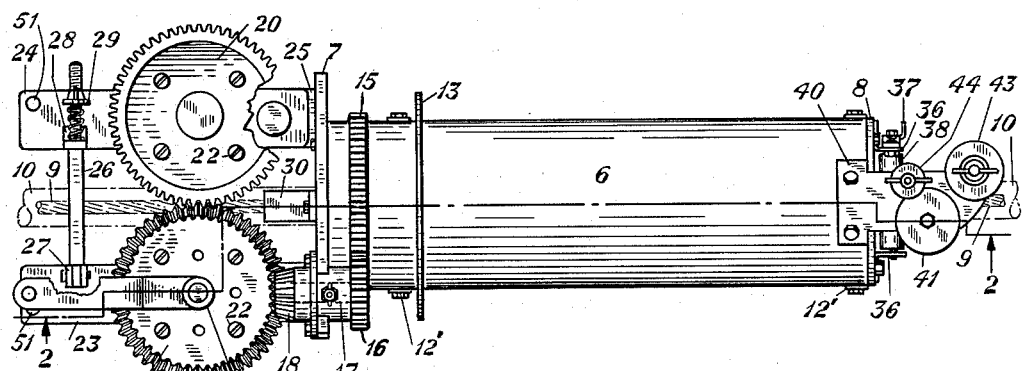
Figure 2:
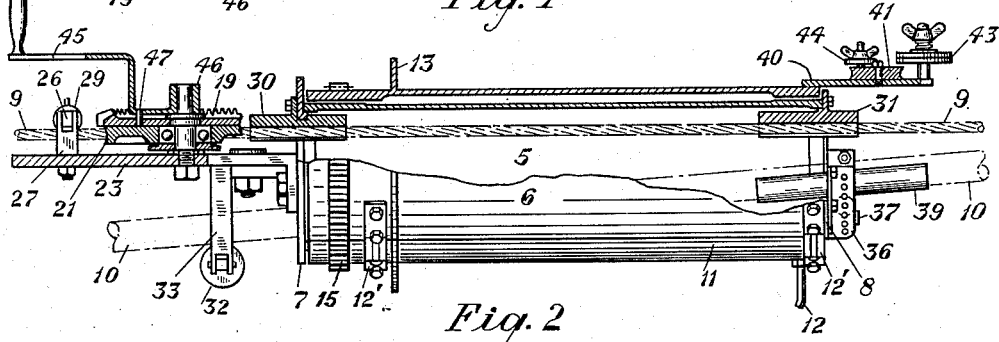
Figure 3:
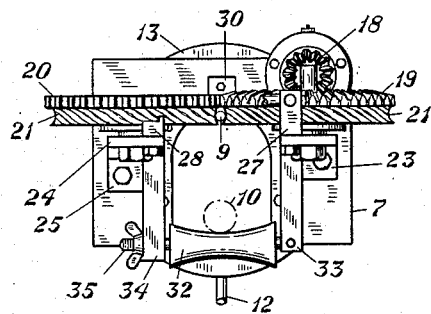
Figure 4:
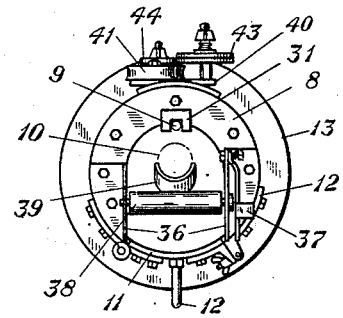
Figure 5:
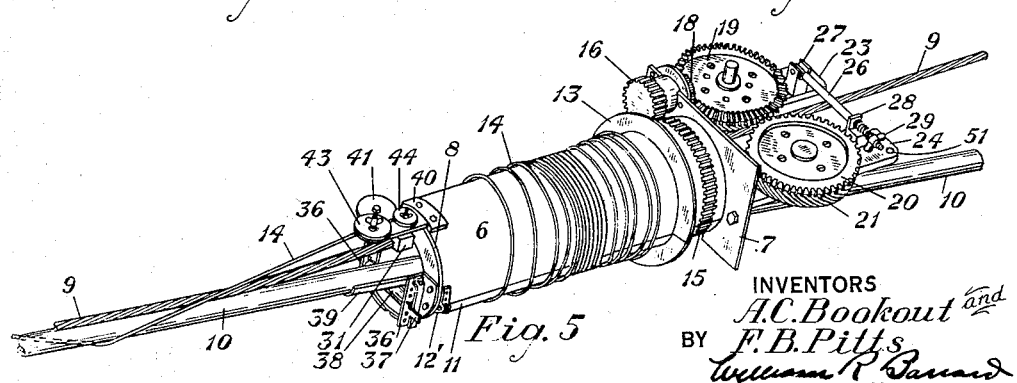
Figure 6:
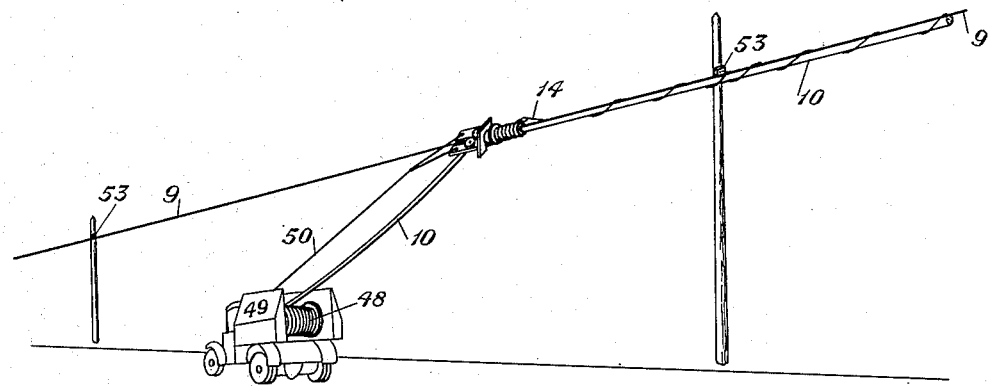
Figure 7:
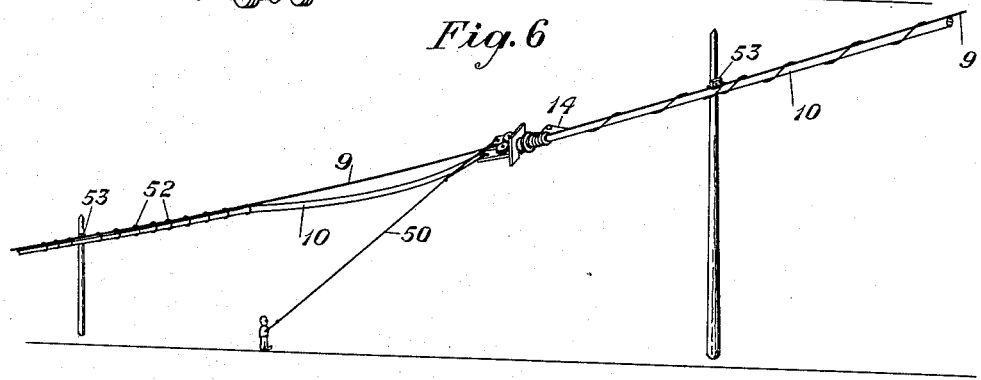
Figures 8, 9:
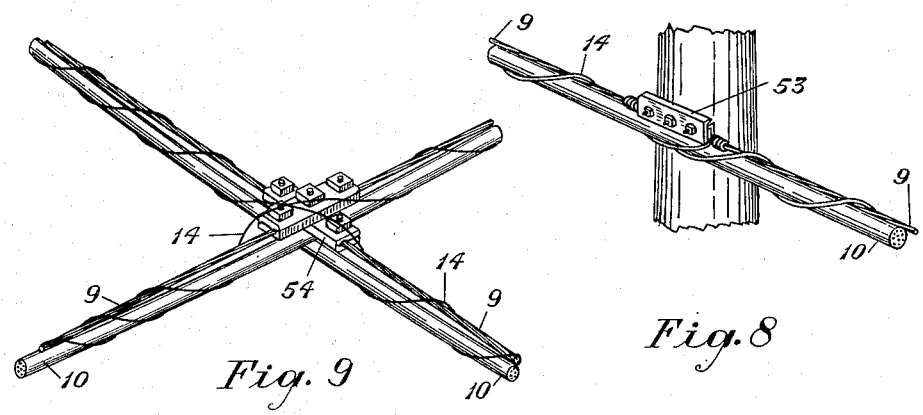
Figure 10:

Referring to the drawings, Figure 1 is a view of the improved device shown in one of its rotated positions; Fig. 2 is a section taken on line 2—2 of Fig. 1 looking in the direction of the arrows, and with a part of the casing broken away to show the interior of the drum; Fig. 3 is an end elevation as viewed from the left of Fig. 2; Fig. 4 is an end elevation as viewed from the right of Fig. 2; Fig. 5 is a perspective view of the device shown in position about a messenger strand and its associated cable; Fig. 6 is a diagrammatic view showing the withdrawal of a cable from a cable reel positioned upon a truck and being attached to a messenger wire by means of the present device as the truck advances; Fig. 7 is a diagrammatic view of an existing strand and a cable supported thereon by cable rings, as shown at the left of the figure, which rings are being replaced by a wire wrapping about the strand and cable as the improved device is manually pulled along the strand, as shown at the right of the figure; Fig. 8 is a view showing the manner of connecting the messenger strand and cable at a pole; Fig. 9 illustrates intersecting lines in which the cables are supported upon the strands in accordance with this invention, and Fig. 10 illustrates a pair of cables being supported on a single messenger strand in accordance with this invention.

The device, as shown in the drawings, includes a drum having an inner cylinder 5 which is fixed, and an outer cylinder 6. The outer cylinder slidingly engages and is adapted to rotate about the inner cylinder 5. The ends of the latter cylinder are fixed by cap screws or the like to a front end plate 7 and to a rear end plate 8. The plates 7 and 8 have cutaway or bifurcated portions which are in alignment with the longitudinal cutaway portion in the inner or fixed cylinder 5. These cutaway portions permit a messenger strand 9 and a cable 10 to be inserted in and removed from the inner cylinder 5 when the longitudinally hinged gate 11 of the rotatable cylinder 6 is open. This gate, when closed, entirely covers the longitudinal slot in the fixed cylinder 5. A handle 12 is suitably attached to the gate, and hinged bolts 12' may be used to maintain the gate in locked position. The handle 12 may be also used to prevent the wire 14 from slipping over the rim of the drum. A flange 13 is provided about the periphery of the movable cylinder 6 near one end of the device and serves to limit the travel of the wire 14 in one direction as it is wound on the movable cylinder. This wire is to be later unwound from this cylinder to secure the cable 10 on the messenger strand 9, as will presently appear.

A peripheral gear 15 is provided about the drum adjacent the plate 7. This gear meshes with a spur gear 16 which is carried on the inner end of a shaft 17. The shaft 17 is journaled in a housing mounted in a semi-circular cutaway portion extending through the surface of plate 7 at one of its corners. A bevel gear 18 is carried at the other or outer end of the shaft 17, and this meshes with the bevel teeth of a gear member 19. This latter member also is provided with a spur gear about its periphery which meshes with a like gear on a companion gear member 20. Each of the gear members 19 and 20 carries a roller-disk 21 on its lower surface, and these roller disks lie in co-planar relation. These disks may be integral with the gear members or secured thereto as, for instance, by means of screws 22. The disks 21 have spiral cuts made in their peripheries which correspond to the helically arranged longitudinal wires which make up the messenger strand 9. The strand is frictionally engaged between these disks so that when the device is pulled along the strand, the disks will ride on the helically arranged wires. The drum under this condition will be caused to rotate, and the wire 14 wound thereon will be automatically uncoiled and wrapped about the strand and cable, as will be presently described.

The gear member 19 is mounted upon a bracket 23, and the associated gear member 20 is mounted upon a plate 24. The bracket 23 is fixed by bolts, or the like, to the plate 7 positioned at the front end of the drum, and the plate 24 is pivotally connected to a bracket 25 which is fixed to the plate 7. The bracket 23 and the plate 24 extend from the plate 7 and normally lie in parallel relation to each other. The bracket 23 and the plate 24 are interconnected by a rod 26. One end of this rod is pivotally connected to a slot headed member 27 which is carried by the bracket 23, and the other end of the rod is threaded and adjustably connected to a bracket 28 secured to the plate 24. A thumb screw 29 is carried on the threaded end of the rod 26 and engages a coiled spring seated on the bracket 28, and compression is thereby exerted on the bracket to maintain the rod in a desired adjusted position. The adjustment of the rod in the manner explained serves to regulate the distance between the roller disks 21 in accordance with the size of the messenger strand upon which the device is mounted so that the helically arranged wires comprising the strand will be firmly engaged by the roller disks.

A guide 30 having a channel portion is suitably fixed to the front mounting plate 7 for the stationary cylinder 5, and a corresponding guide 31 is fixed to the rear mounting plate 8. The channel portions of these guides are in alignment with each other and with the messenger strand 9 as it passes through the roller disks 21. These guides serve to maintain the present device in position as it is advanced along the messenger strand 9.

Guides are also provided for the cable 10 as it passes through the drum 5. The front guide includes a roller 32 which is journaled on a pin. This pin is provided with an opening at one end, which opening coincides with openings in a slotted extremity of an extension 33 from the bracket 23. A bolt is passed through the openings in the journal pin and slotted extremity of the extension 33 and hinges one end of the pin to said extremity. The other end of the pin passes through a slotted end of an extension 34 of the arm 24 and is engaged by a wing nut 35. This nut is prevented from downward displacement by toes which project from the outer corners of the slotted extremity of the extension 34. The rear guide for the cable includes a spindle which is adjustably mounted on parallel angle plates 36, 36. These angular members are suitably fixed to the rear plate 8, and have a series of coinciding openings in which the ends of the spindle may register in accordance with the diameter of the cable which passes through the drum. The spindle is provided at one end with an enlarged ear which is maintained against the outside surface of one of the angle plates by a spring-keeper 37 mounted on the plate Figs. 4 and 5. The other end of the spindle registers in a corresponding hole in the opposite plate. A cylindrical member or pipe 38 is carried on the spindle between the parallel angle members 36 and a semi-circular trough 39 is welded or otherwise fixed thereto. This trough extends longitudinally of and through the end of the drum and carries a cylindrical member 38. The unit comprising the member 38 and trough 39 may be readily interchanged for other units so that the trough member may accommodate cables of different diameters. This unit is pivotally mounted upon the spindle and automatically adjusts itself in accordance with the vertical angular movement of the cable seated in the trough. This trough is positioned slightly higher than the roller 32 on the front end of the drum, and accordingly the cable will be slightly elevated as it passes through the drum and will leave it at a higher level and nearer the messenger strand than at its point of entrance. The cable 10 is thus guided through the trough so that it will lie in a position against the strand, Fig. 5, as the drum is rotated, and no slack will exist between the strand and the cable.

A bracket 40 is mounted on the surface of the rotatable cylinder 6 at its rear end, and is provided with an angular portion which clears the end plate 8 as said cylinder turns. A grooved roller 41 is carried by the bracket 40 over which passes the wire or tape 14 to be wound or unwound from the rotatable cylinder. A disk 43 is also mounted on the bracket 40 and serves as a guide and as a tension adjuster for the wire or tape 14. The disk 43 is mounted on a stud which carries a coiled spring and a wing nut which regulate the tension exerted by the disk on the wire or tape. An additional disk 44 is carried by the bracket 40 and is mounted on a stud having a wing nut thereon. This latter disk also acts as a guide for the wire or tape and is adapted to clamp against the roller 41.

The wire or tape may be mounted on the drum by any suitable means as, for example, by means of a crank 45 which is shown in position in Fig. 2. The end of this crank engages a stud 46 projecting from the center of the gear member 19, and a pin 47 carried by the crank is adapted to be inserted in any of the holes radially disposed about the stud 46 to prevent slippage of the crank while in operation. The crank 45 causes the rotation of the gear member 19, which in turn transmits rotation through its bevel gear to the bevel pinion 18, spur gear 16 to the peripheral gear 15 of the rotatable cylinder 6 of the drum. The cylinder 6 is thus rotated by the crank, and, with one end of the wire or tape secured to the messenger strand or held by the tension adjuster disk on the rear end of the cylinder, the rotation is continued until a layer of wire or tape is wound upon the cylinder to the point where the peripheral flange 13 is positioned.

In the diagrammatic representation illustrated in Fig. 6, the cable 10 is shown extending from a cable reel carried by a truck 49 to the messenger strand 9 through the drum of the present device. One end of a line 50 is fastened to the truck and the other end of the line is suitably attached to openings 51, 51 in the bracket 23 and plate 24, respectively, which extend from the forward part of the drum, as previously described. The improved device will be pulled along the messenger strand by the line 50 as the truck advances, and the cable will be unwound from its reel accordingly. Thus as the cable is unwound from its reel it will be taken up and passed through the drum as it is drawn along the strand and will be wrapped or lashed to the strand by the wire or tape 14, which is automatically uncoiled from the drum in its travel.

In the diagram appearing in Fig. 7 the device is shown as being manually pulled along the messenger strand, and the wire or tape 14 is wrapped about the strand and cable in place of the cable rings 52 which were formerly used to suspend the cable from the strand. In installations of this character, a lineman rides along the messenger strand in a cable car and removes the rings 52. As the removal of the cable rings 52 proceeds, the drum is advanced along the strand and the wire or tape 14 is wrapped about the strand or cable, as formerly described.

The messenger strand described herein may be attached to a pole, as shown in Fig. 8, wherein a suspension clamp 53 is applied to the pole to hold the strand and cable in position.

The support of cables on messenger strands may be applied in the case of intersecting wires, as shown in Fig. 9. A clamp 54 may be connected to the messenger strands at the point of intersection by a lineman, and the operation of wrapping the wire or tape about these strands may be proceeded with as in the case of a line such as is shown in either Fig. 6 or Fig. 7.

The device is also adapted to wrap a pair of cables to a single messenger strand, as indicated in Fig. 10.

In the application of the improved device it is taken up a pole and the longitudinal gate is opened to permit the insertion of a messenger strand and cable within the drum. The strand is adjusted between the friction roller disks 21, and is seated in the guide members 30 and 31, while the cable is seated upon the front roller 32 and in the trough member 39. The strand is also adjusted at this time in the rollers and disks at the front of the drum. After the insertion of the cable and strand in the drum and adjustments having been made, the gate is closed and locked by means of the bolts. The wire or tape may be now coiled about the outer or rotatable cylinder by means of the crank. After sufficient wire or tape is coiled on the drum, the end of the wire or tape is clamped to the strand, and the drum may be drawn along the strand by manual power or by means of a truck. In its travel along the strand the wire or tape will be uncoiled from the drum and wrapped about the strand and cable as the cylinder rotates to secure them together.

While the arrangements of this invention have been illustrated as embodied in a certain specific form which has been deemed desirable, it will be understood that they are capable of embodiment in many and widely varied forms without departing from the spirit of the invention as defined in the appended claims.

What is claimed is:

1. Means for securing a cable in position upon a messenger strand, including a drum adapted to be placed about and advanced along the strand and cable line, wrapping material carried by the drum, and means frictionally engaging the strand and geared to rotate the drum as it is advanced to unreel the wrapping material therefrom and coil it about the cable and strand to support the cable on the strand.

2. Means for securing a cable in position upon a messenger strand composed of helical disposed wires, including a drum adapted to be placed about and advanced along the strand and cable line, wrapping material carried by the drum adapted to be coiled about the cable and strand, and means frictionally engaging the helically disposed wires of the strand upon the advancement of the drum thereover and geared to rotate the drum and automatically uncoil the material thereon and wrap it about the strand and cable to support the cable on the strand.

3. Means for securing a cable in position upon a messenger strand composed of helical disposed wires, including a drum adapted to be placed about and advanced along a strand and cable line, wrapping material carried by the drum adapted to be coiled about the cable and strand, and roller members carried forwardly of the drum and having spiral cuts about their peripheries to frictionally engage the helically disposed wires of the strand upon the advancement of the drum thereover to rotate the drum and automatically uncoil the material thereon and wrap it about the strand and cable to support the cable on the strand.

4. A device for coiling material about a messenger strand and cable to support the cable on the strand, including a cylinder adapted to be placed about the cable and strand and advanced along the strand, gearing for rotating the cylinder, means frictionally engaging the strand upon the advance of the cylinder to operate the gearing, and wrapping material carried by the cylinder and automatically drawn therefrom and coiled about the strand and cable upon the advance of the cylinder along the strand to support the cable thereon.

5. A device including a cylinder adapted to be rotatably advanced along a messenger strand and cable, guides for the strand and cable carried by the cylinder, gear mechanism for rotating the cylinder, strand-engaging members for operating the gear mechanism upon the advancement of the cylinder along the strand, and wrapping material wound on the cylinder and automatically withdrawn therefrom and coiled about the strand and cable to secure the cable to the strand upon the advance of the cylinder.

6. A device including a cylinder adapted to be rotatably advanced along a messenger strand and cable, guides for the strand and cable carried by the cylinder, gear mechanism for rotating the cylinder, a pair of rollers arranged to engage opposite sides of said strand and being adjustable with respect to each other to engage different sizes of strand, said pair of rollers being also adapted to operate the gear mechanism upon the advancement of the cylinder along the strand, and wrapping material wound on the cylinder and automatically withdrawn therefrom and coiled about the strand and cable to secure the cable to the strand upon the advance of the cylinder.

7. Means for securing a cable in position upon a messenger strand composed of helical disposed wires, including a drum adapted to be placed about and advanced along a strand and cable line, wrapping material carried by the drum adapted to be coiled about the cable and strand to support the cable on the strand, roller members arranged to engage opposite sides of said strand and being adjustable with respect to each other to engage different sizes of strands, a gearing arrangement between said rollers and said drum so that as the drum is advanced along the strand the rollers rotate, and in turn cause rotation of the drum.

8. Means for securing a cable in position upon a messenger strand composed of helical disposed wires, including a drum adapted to be placed about and advanced along a strand and cable line, wrapping material carried by the drum adapted to be coiled about the cable and strand to support the cable on the strand, roller members arranged to engage opposite sides of said strand and being adjustable with respect to each other to engage different sizes of strands, a gearing arrangement between said rollers and said drum so that as the drum is advanced along the strand the rollers rotate, and in turn cause rotation of the drum, said rollers being geared to each other so as to rotate together as they roll along the strand.

9. A device for coiling material about a messenger strand and cable to support the cable on the strand, including a cylinder adapted to be placed about the cable and strand and advanced along the strand, a pivoted gate extending longitudinally of the cylinder through which the cable and strand may be inserted and removed from the cylinder, gearing for rotating the cylinder, means frictionally engaging the strand upon the advance of the cylinder to operate the gearing, wrapping material carried by the cylinder and automatically drawn therefrom and coiled about the strand and cable upon the advance of the cylinder along the strand to support the cable thereon.

10. A device including a cylinder adapted to be rotatably advanced along a messenger strand and cable, a pivoted gate extending longitudinally of the cylinder through which the cable and strand may be inserted and removed from the cylinder, guides for the strand and cable carried by the cylinder, gear mechanism for rotating the cylinder, strand engaging members for operating the gear mechanism upon the advancement of the cylinder along the strand, and wrapping material wound on the cylinder and automatically withdrawn therefrom and coiled about the strand and cable to secure the cable to the strand upon the advance of the cylinder.

11. A device for coiling material about a messenger strand and cable to support the cable on the strand, including a cylinder adapted to be placed about the cable and strand and advanced along the strand, a pivoted gate extending longitudinally of the cylinder through which the cable and strand may be inserted and removed from the cylinder, means frictionally engaging the strand upon the advance of the cylinder, said means comprising a pair of roller members arranged to engage opposite sides of said strand and being adjustable with respect to each other to engage different sizes of strands, a gearing arrangement between said rollers and said cylinder so that as the cylinder is advanced along the strand the rollers rotate and in turn cause the rotation of the cylinder, said rollers being geared to each other so as to rotate together as they roll along the strand and wrapping material carried by the cylinder and automatically drawn therefrom and coiled about the strand and cable upon the advance of the cylinder along the strand to support the cable thereon.

12. The method of suspending a cable from a strand which consists in moving a reel of cable longitudinally of the strand, unreeling the cable as it is advanced, moving a coil of wire longitudinally of the strand in the direction of movement of the reel of cable, unreeling the wire as the coil is moved longitudinally, and wrapping the unreeled wire about the cable and the strand in accordance with the movement of the reel of cable to support the cable on the strand.

ARCHIE COLEMAN BOOKOUT.
FREDERICK BAXTER PITTS.